United States Patent [19]
Wojtowicz

[11] 4,071,605
[45] Jan. 31, 1978

[54] PROCESS FOR THE PRODUCTION OF DIBASIC MAGNESIUM HYPOCHLORITE

[75] Inventor: John A. Wojtowicz, Cheshire, Conn.

[73] Assignee: Olin Corporation, New Haven, Conn.

[21] Appl. No.: 763,969

[22] Filed: Jan. 31, 1977

[51] Int. Cl.$^2$ .................. C01B 11/00; C01B 7/02; C01B 11/06; C01F 5/00
[52] U.S. Cl. .................. 423/462; 423/473; 423/503
[58] Field of Search ............ 423/473, 504, 462, 505, 423/DIG. 15

[56] References Cited
U.S. PATENT DOCUMENTS

| | | | |
|---|---|---|---|
| 1,400,167 | 12/1921 | Kereszty et al. | 423/473 |
| 3,582,265 | 6/1971 | Bishop et al. | 423/473 |

FOREIGN PATENT DOCUMENTS

| | | | |
|---|---|---|---|
| 75,045 | 5/1917 | Switzerland | 423/473 |

*Primary Examiner*—Edward Stern
*Attorney, Agent, or Firm*—James B. Haglind; Donald F. Clements; Thomas P. O'Day

[57] ABSTRACT

A process for the production of dibasic magnesium hypochlorite comprises the reaction of a solid magnesium salt and a solid hypochlorite where one of the solid reactants is in the hydrate form. The process produces dibasic magnesium hypochlorite with excellent recovery of chlorine values and with reduced requirements for the disposal of solutions containing available chlorine.

Dibasic magnesium hypochlorite, $Mg(OCl)_2 \cdot 2 Mg(OH)_2$ is useful in bleaching and sanitizing applications.

12 Claims, No Drawings

PROCESS FOR THE PRODUCTION OF DIBASIC MAGNESIUM HYPOCHLORITE

This invention relates to a process for the preparation of dibasic magnesium hypochlorite. Dibasic magnesium hypochlorite is useful as a bleaching and sanitizing agent.

Dibasic magnesium hypochlorite, corresponding to the formula:

$$Mg(OCl)_2 . 2 Mg(OH)_2$$

has been prepared by the reaction of an alkaline aqueous solution of a hypochlorite with an acidic aqueous solution of a magnesium salt, as described in U.S. Pat. No. 3,582,265, issued June 1, 1971 to J. J. Bishop and S. I. Trotz. In this process, a solution containing at least about 15 percent by weight of magnesium chloride or nitrate is admixed with a hypochlorite solution containing from 2 to 10 gram moles per liter of hypochlorite ion while maintaining the pH of the reaction mixture between 3 and 7. While this process is satisfactory for the production of dibasic magnesium hypochlorite, control in feeding the reactants to the reaction mixture is necessary to avoid the precipitation of magnesium hydroxide. Waste solutions containing available chlorine are also produced which must be properly disposed of and chlorine values are lost which result in an undesired expense.

Therefore, there is a need for an improved process for the production of dibasic magnesium hypochlorite which does not employ solutions of reagents and which avoids the need for pH control of the reaction mixture.

It is an object of the present invention to provide a process for the production of dibasic magnesium hypochlorite employing a solid phase reaction.

An additional object of the present invention is a process for the production of dibasic magnesium hypochlorite which provides for nearly quantitative recovery of chlorine values.

A further object of the present invention is a process for the production of dibasic magnesium hypochlorite having reduced requirements for the disposal of waste solutions containing available chlorine.

These and other objects of the present invention are accomplished in a process for the production of dibasic magnesium hypochlorite which comprises the reaction of a solid magnesium salt with a solid hypochlorite salt selected from the group consisting of alkali metal hypochlorites and calcium hypochlorites wherein at least one of the salts is present as a hydrate.

More in detail, the novel solid phase reaction of the present process employs as one reagent, a solid magnesium salt. The magnesium salt in any suitable salt such as magnesium acetate, magnesium carbonate, magnesium chlorate, magnesium perchlorate, magnesium chloride, magnesium chromate, magnesium nitrate, and magnesium sulfate.

The second reagent is a solid hypochlorite selected from the group consisting of alkali metal hypochlorites and calcium hypochlorite. Suitable alkali metal hypochlorites include lithium hypochlorite and sodium hypochlorite.

It is a requirement of the novel process of the present invention that at least one of the solid reactants be in the hydrate form. Where the hydrate is the magnesium salt, suitable examples include magnesium acetate tetrahydrate, magnesium carbonate hexahydrate, magnesium chlorite hexahydrate, magnesium perchlorate hexahydrate, magnesium chloride hexahydrate, magnesium chromate heptahydrate, magnesium nitrate dihydrate, magnesium nitrate hexahydrate, magnesium sulfate monohydrate and magnesium sulfate heptahydrate.

When the solid hypochlorite is in the hydrate form, suitable examples include sodium hypochlorite monohydrate, sodium hypochlorite dihydrate, sodium hypochlorite pentahydrate, hydrated calcium hypochlorite, calcium hypochlorite dihydrate, $Ca(OCl)_2 . 2H_2O$; calcium hypochlorite trihydrate, $Ca(OCl)_2 . 3H_2O$; and calcium hypochlorite tetrahydrate, $Ca(OCl)_2 . 4H_2O$.

By the term "hydrated calcium hypochlorite" is meant a calcium hypochlorite composition having a water content of from about 3 to about 15, and preferably from about 6 to about 12 percent by weight where the $Ca(OCl)_2$ content is at least 55 percent by weight. Hydrated calcium hypochlorite can be produced, for example, by the methods of U.S. Pat. No. 3,645,005, issued to G. R. Dychdala or U.S. Pat. No. 3,669,894, issued to J. P. Faust.

In selecting solid magnesium salts as reactants, it is preferred that those salts be selected which are commercially available and economic to use and that, if a by-product calcium salt is produced, the calcium salt be more soluble in, for example, water than dibasic magnesium hypochlorite to facilitate separation of the products. Preferred magnesium salts include magnesium acetate, magnesium chloride, magnesium nitrate and hydrates thereof.

Calcium hypochlorite and its hydrates are preferred solid hypochlorite reactants.

The process of the present invention is carried out by admixing suitable proportions of the solid magnesium salt and the solid hypochlorite. For example, molar ratios of the magnesium salt to the hypochlorite ion of from about 0.5:1.0 to about 2.0:1.0 are quite satisfactory with molar ratios of from about 0.75:1.0 about 1.0:1.0 being preferred.

Suitable amounts of water of hydration include, for example, from about 2 to about 8 moles per mole of dibasic magnesium hypochlorite produced.

The reaction proceeds at ambient temperature and the rate is evidenced by the amount of chlorine evolved. Suitably, the reaction vessel is closed and is equipped with or associated with means for recovering the chlorine gas. The reaction vessel is also equipped with means for agitating or stirring the reaction mixture to provide suitable contact between the reactants and to facilitate the release of chlorine gas formed. The reaction proceeds in the absence of external heating or cooling. Chlorine evolution is believed to provide a cooling effect on the reaction mixture. Cessation of chlorine evolution is evidence of the completion of the reaction.

To remove any by-product calcium salt which is formed, the reaction mixture is washed with a solvent such as water, filtered and the solid dibasic magnesium hypochlorite is recovered and dried.

The process of the present invention suitably employs commercially available grannular magnesium salts and hypochlorite salts. For example, particle sizes of from about −5 to about +325 mesh, preferably from about −10 to about +200 mesh and more preferably from about −30 to about +70 mesh may be employed. It may be desirable to employ finer granules of the reactants at the start of the reaction with coarser granules being added as the reaction proceeds.

Chlorine gas evolved may be recovered, for example, by absorption in an alkali such as lime or sodium hydroxide to form calcium hypochlorite or sodium hypochlorite which may be suitably recycled as reactants to the process. If desired, an inert gas such as nitrogen or air may be used to purge the reaction mixture to facilitate chlorine recovery.

The process of the present invention produces dibasic magnesium hypochlorite where the recovery of chlorine values is nearly quantitative, and the disposal of waste streams containing available chlorine is minimized. No additional water is required by the reaction mixture other than that provided by the hydrate salt.

The following examples are presented to illustrate the invention more fully. All parts and percentages are by weight unless otherwise specified.

EXAMPLE 1

Granular $MgCl_2 \cdot 6H_2O$ (60.9g, 0.30 mol) and granular anhydrous calcium hypochlorite (39.7g, 0.20 mol) having an available chlorine content of 71 percent as $Ca(OCl)_2$ were mixed at ambient temperature in a reaction vessel equipped with a mechanical stirrer. Upon admixing the reactants, an immediate evolution of chlorine was observed. The reaction mixture went through several stages: the initial granular stage became lumpy. The lumps were transformed into a viscous mass which in turn became a thick slurry. Evolved chlorine gas was purged-out with a stream of $N_2$, and the chlorine absorbed in a scrubber containing a potassium iodide solution. After setting overnight, water was added to the reaction mixture to form a slurry. The slurry was filtered, washed and the filter cake vacuum dried, to give 23.6g of a solid product having an available chlorine content of 50 percent. The product was identified as dibasic magnesium hypochlorite by its x-ray diffraction pattern. Titration of the potassium iodide solution with sodium thiosulfate solution indicated a chlorine recovery of about 90 percent, based on the calcium hypochlorite charged.

EXAMPLE 2

Commercial granular calcium hypochlorite 103.0g (0.50 mol) having an available Cl content of 68.75 percent and 152.8g (0.75 mol) granular magnesium chloride hexahydrate were added to a reactor having a mechanical stirrer. The solids combined with the evolution of chlorine gas and when the reaction mixture was transformed into a thick slurry, an increment, identical to the initial amounts of reactants was added. Periodically, a portion of the product slurry was removed from the reactor, filtered, washed several times with water, vacuum dried and the available chlorine content of the dibasic magnesium hypochlorite determined. The reaction was continued until a total of ten incremental additions had been made, each addition containing amounts equal to the amounts initially used of $MgCl_2 \cdot 6H_2O$ and the $Ca(OCl)_2$. The available chlorine content of the dibasic magnesium hypochlorite was in the range of from 50.5 to 54.5 percent. The product contained less than 0.7 percent chlorate and less than 0.3 percent chloride.

EXAMPLE 3

The procedure of Example 1 was repeated reacting $Mg(NO_3)_2 \cdot 6H_2O$ (6.15g, 24m mols) with 3.36g (16m mols) of commercial calcium hypochlorite having an available chlorine content of 68 percent without, however, absorbing the $Cl_2$ evolved in a potassium iodide solution. The particle size of the reactants was in the range of about 30 to 50 mesh. After evolution of $Cl_2$ and allowing the reaction mixture to sit overnight, the product was isolated as in Example 1. The vacuum dried dibasic magnesium hypochlorite product weighed 1.3g and had an available chlorine content of 52.2 percent.

What is claimed is:

1. A process for the production of dibasic magnesium hypochlorite which comprises reacting a solid granular magnesium salt with a solid granular hypochlorite salt selected from the group consisting of alkali metal hypochlorites and calcium hypochlorite wherein at least one of said salts is present as a hydrate to form a reaction mixture, agitating said reaction mixture, and recovering said dibasic magnesium hypochlorite therefrom.

2. The process of claim 1 in which said solid magnesium salt is selected from the group consisting of magnesium acetate, magnesium carbonate, magnesium chlorate, magnesium perchlorate, magnesium chloride, magnesium chromate, magnesium nitrate, magnesium sulfate, and hydrates thereof.

3. The process of claim 1 in which said solid hypochlorite is an alkali metal hypochlorite selected from the group consisting of lithium hypochlorite and sodium hypochlorite dihydrate.

4. The process of claim 1 in which said solid hypochlorite salt is selected from the group consisting of anhydrous calcium hypochlorite, hydrated calcium hypochlorite, calcium hypochlorite dihydrate, calcium hypochlorite trihydrate and calcium hypochlorite tetrahydrate.

5. The process of claim 2 in which said solid magnesium salt is selected from the group consisting of magnesium acetate, magnesium chloride, magnesium nitrate, magnesium sulfate and hydrates thereof.

6. The process of claim 5 in which said solid hypochlorite salt is selected from the group consisting of anhydrous calcium hypochlorite, hydrated calcium hypochlorite, calcium hypochlorite dihydrate, calcium hypochlorite trihydrate and calcium hypochlorite tetrahydrate.

7. The process of claim 6 in which said solid hypochlorite salt is anhydrous calcium hypochlorite.

8. The process of claim 7 in which said solid magnesium salt is selected from the group consisting of magnesium acetate, magnesium chloride, magnesium nitrate and hydrates thereof.

9. The process of claim 8 in which said solid magnesium salt is magnesium chloride hexahydrate.

10. The process of claim 8 in which said solid magnesium salt is magnesium nitrate hexahydrate.

11. The process of claim 2 in which said solid magnesium salt is selected from the group consisting of magnesium acetate tetrahydrate, magnesium carbonate hexahydrate, magnesium chlorate hexahydrate, magnesium perchlorate hexahydrate, magnesium chloride hexahydrate, magnesium chromate, magnesium nitrate dihydrate, magnesium nitrate hexahydrate, magnesium sulfate monohydrate and magnesium sulfate heptahydrate.

12. The process of claim 11 in which said solid hypochlorite salt is selected from the group consisting of hydrated calcium hypochlorite, calcium hypochlorite dihydrate, calcium hypochlorite trihydrate and calcium hypochlorite tetrahydrate.

* * * * *